May 19, 1964 W. W. COLLINS ETAL 3,133,623
TRAVERSING FEED MECHANISM
Filed July 26, 1961 5 Sheets-Sheet 3

INVENTORS
WILLIAM W. COLLINS
ALBERT W. G. ERVINE
FRANK H. SMITH
BY
ATTORNEYS

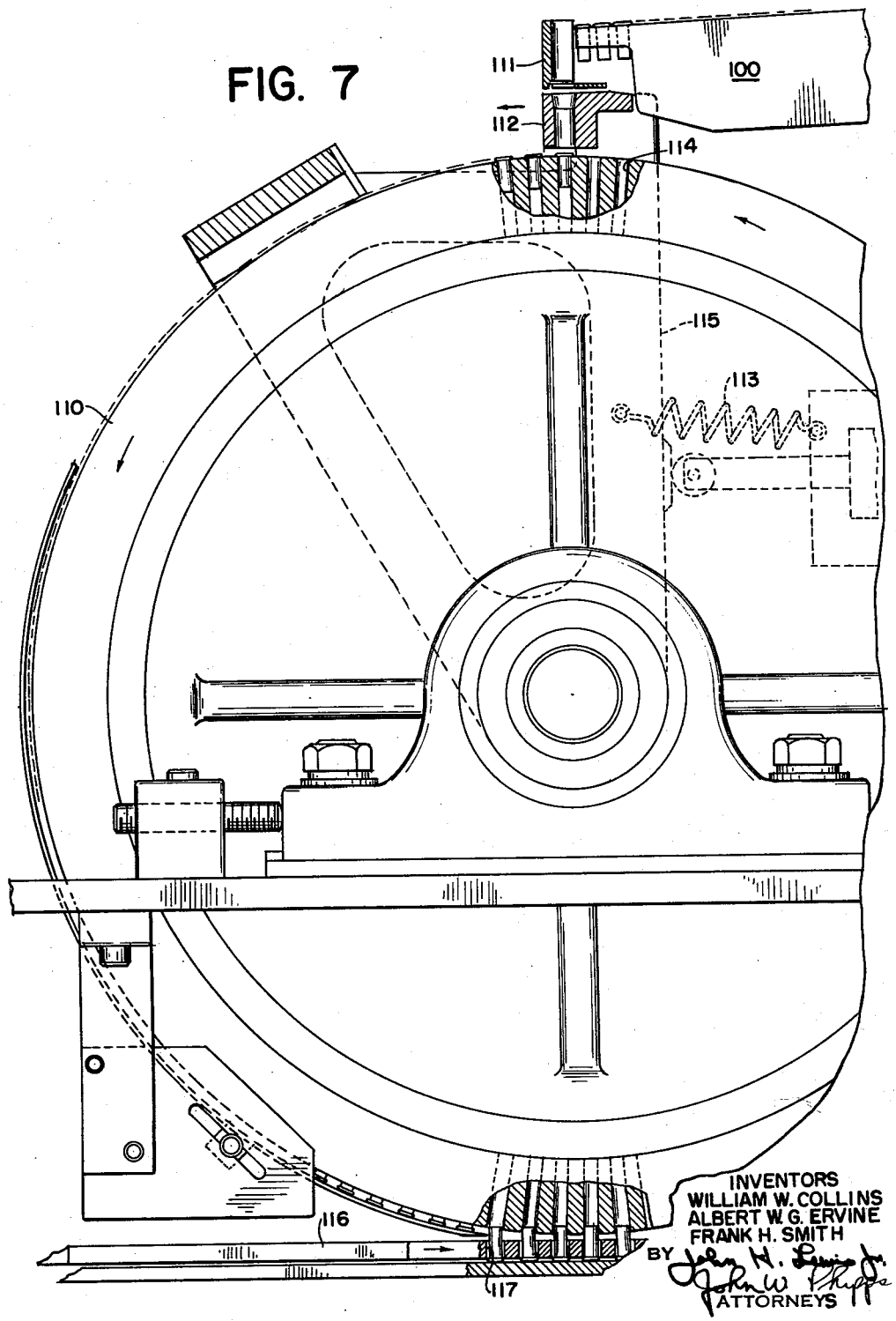

United States Patent Office 3,133,623
Patented May 19, 1964

3,133,623
TRAVERSING FEED MECHANISM
William W. Collins, San Jose, Calif., and Albert W. G. Ervine, Bridgeport, and Frank H. Smith, Trumbull, Conn., assignors to Remington Arms Company, Inc., Bridgeport, Conn., a corporation of Delaware
Filed July 26, 1961, Ser. No. 127,028
15 Claims. (Cl. 198—26)

This invention relates to means for securing an ordered arrangement of elongated longitudinally asymmetric articles in a carrier or conveyor which is provided with individual receptacles for such articles. For the purpose of illustration, the invention will be described with reference to the handling of small arms cartridges and components thereof, such as .22 caliber cartridges having heads of a greater transverse diameter than their body diameter, or empty or primed shells for such cartridges. The invention is particularly adapted to the loading of a conveyor or a carrier of the type described in the patent to Collins et al., No. 2,849,980, issued September 2, 1958, or the patent to Mills et al., No. 2,728,260, issued December 27, 1955, or to the loading of primed shells into plates for inspection or other purpose.

In the drawings:

FIG. 7 is a sectional elevation of a modification.

Cartridges from a heterogeneous mass in a hopper are arranged suspended by their heads between adjacent members of a set of rails 10 which are so spaced as to pass the bodies but not the heads of the cartridges, shells or other articles being handled. The means for thus securing rows of cartridges suspended by their heads in side-by-side relation is not shown since it forms no part of the present invention. It may be a modification of the device described in the aforementioned patent to Collins et al. It is sufficient to say that the set of spaced bars 10 is part of a unitary frame which is so actuated by a vibrator as to urge contained articles forward toward the delivery end, where they are received by the transfer mechanism to be described. There may be many such rails, say 50, in parallel relation, but to avoid unnecessary duplication only a small number of rails and a small number of associated elements of the transfer mechanism have been illustrated.

Figure 1:
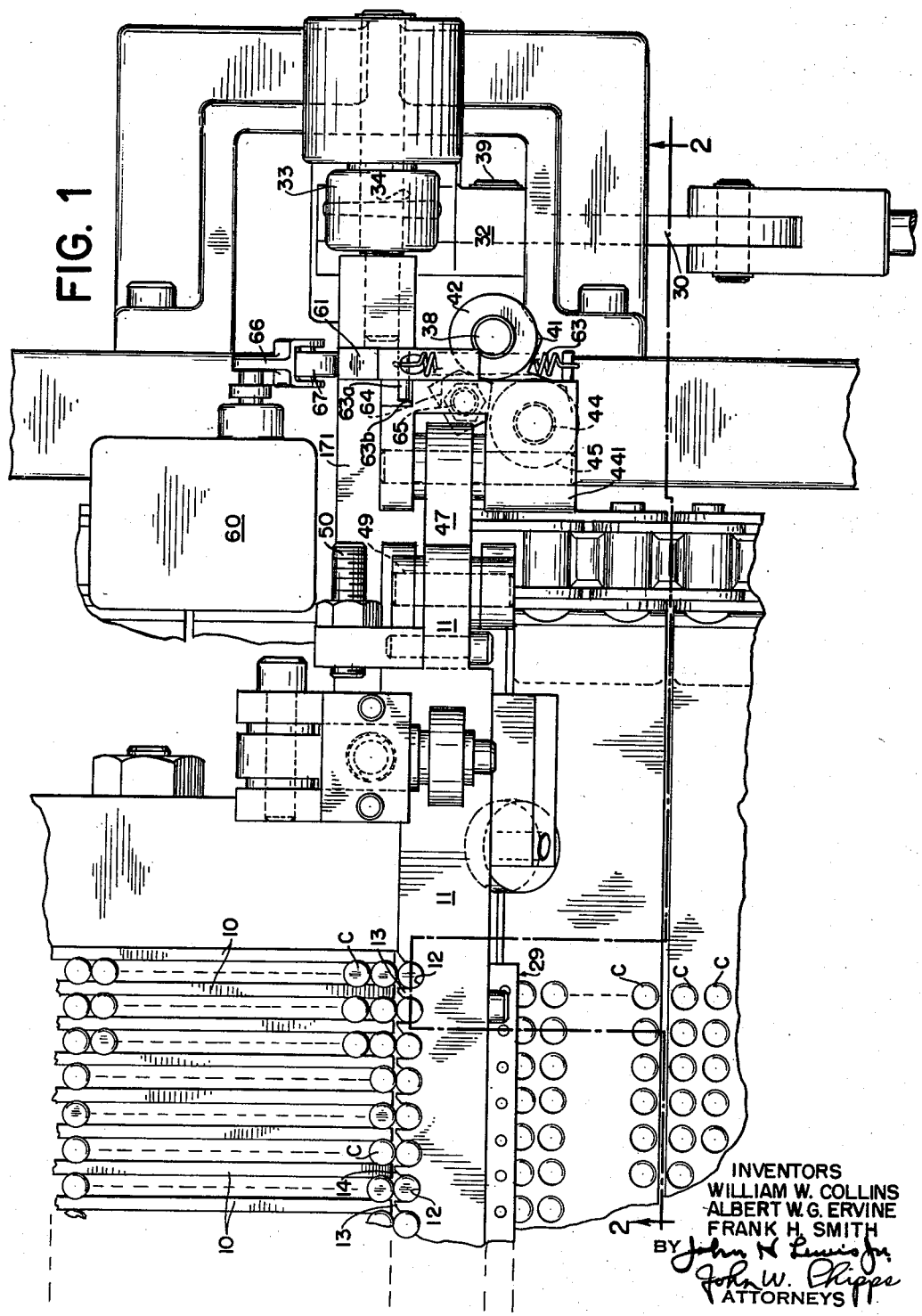
FIG. 1 is a fragmentary plan view of a conveyor loader comprising one embodiment of the invention.
Figure 5:
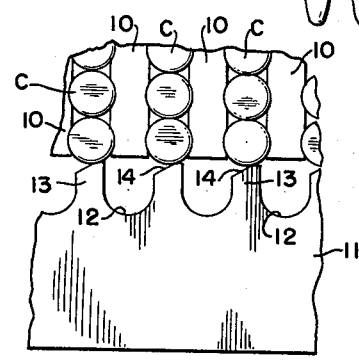
FIG. 5 is a fragmentary detail plan showing the transfer bar in FIG. 4 position.

Adjacent the ends of the rails 10 is a reciprocating transfer bar 11 which extends transversely of the set of rails and is provided with arcuate notches 12, the spacing of which is identical with the spacing of the parallel rows of cartridges C held by rails 10. The fingers 13 between the notches 12 are provided with cam faces 14. The normal or cartridge receiving position of transfer bar 11 is shown in FIG. 1. Cartridges from the slots between adjacent rails have been moved into notches, and the adjacent foremost cartridges between the rails are in contact with those in the notches. From this position the transfer bar is shifted to the left from the FIG. 1 position to the FIG. 5 position, bringing each finger 13 opposite the end of a row of cartridges between a pair of rails, the cam face 14 serving to establish clearance between the foremost cartridges in the rails and the cartridges in the notches 12. When the transfer bar is in FIG. 1 position, the cartridges therein are supported below by abutments supplied by a fixed channel member 15 provided with vertical passages 16, each of which is in vertical alignment with a notch 12 when the transfer bar is in the FIG. 5 position. The mouths of the passages 16 are chamfered as shown at 17 to facilitate the movement of cartridges or other articles therethrough—thus when the transfer bar is shifted to the FIG. 5 position the row of cartridges in the notches 12 is immediately dropped through passages 16.

Figure 2:
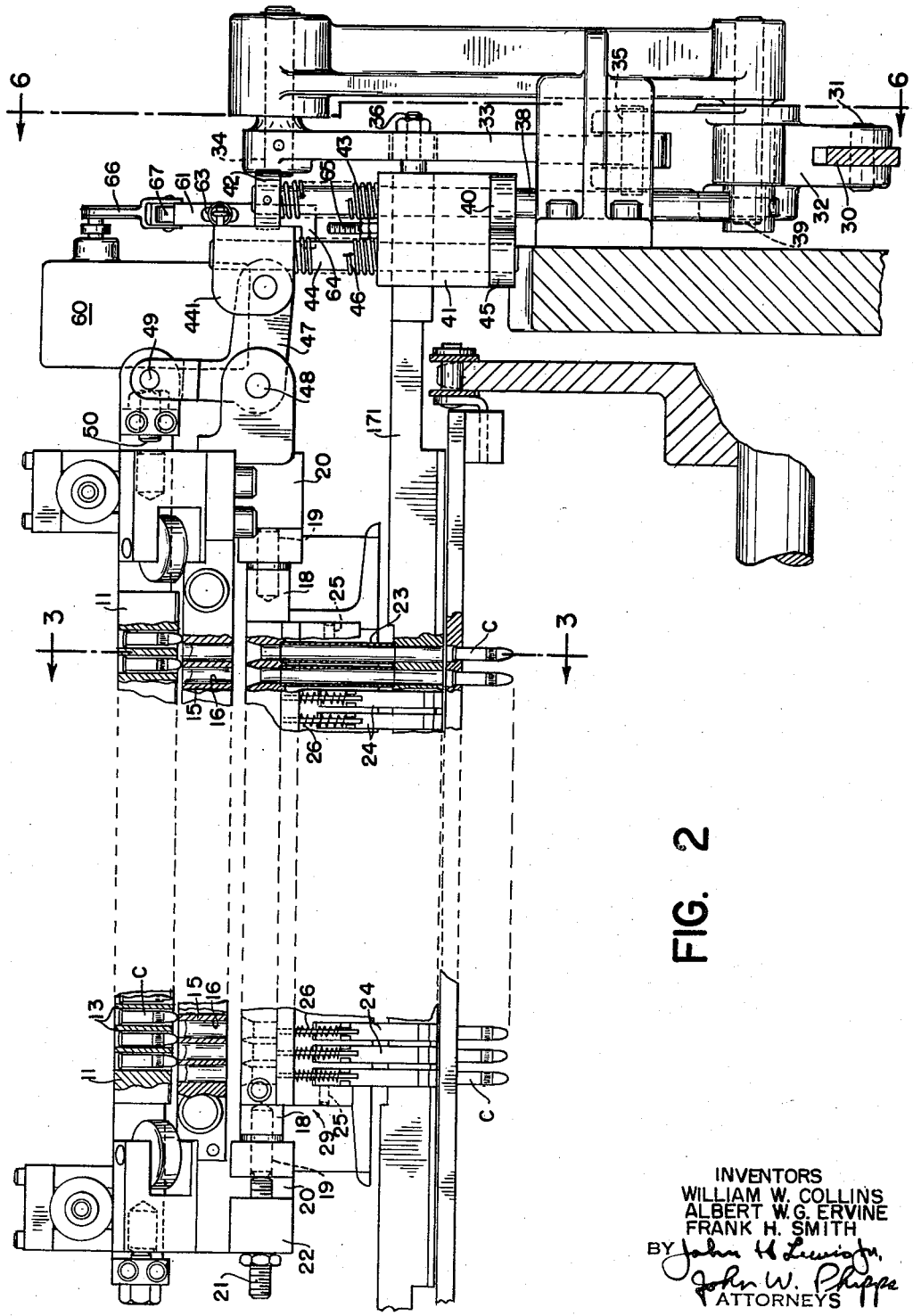
FIG. 2 is a fragmentary front elevation, partly in section substantially on line 2—2 of FIG. 1.

Cartridges thus delivered through passages 16 are received in vertically aligned passages in an oscillating assembly identified generally by numeral 29. This assembly comprises hubs 18 (FIG. 2) adapted to receive pivot pins 19 projecting from fixed supports 20. Adjustment screw 21 threaded in fixed member 22 may be provided to facilitate accurate lengthwise positioning of the oscillating assembly. Said assembly comprises tubelike passages 23 in vertical alignment respectively with the passages 16 and the notches 12 when in cartridge delivering position. To prevent jams and to facilitate the clearing of jams, one side of each passage 23 may comprise the rocking member 24 pivoted in the assembly at 25, and urged into normal closed position by suitable means such as spring 26.

Figure 3:
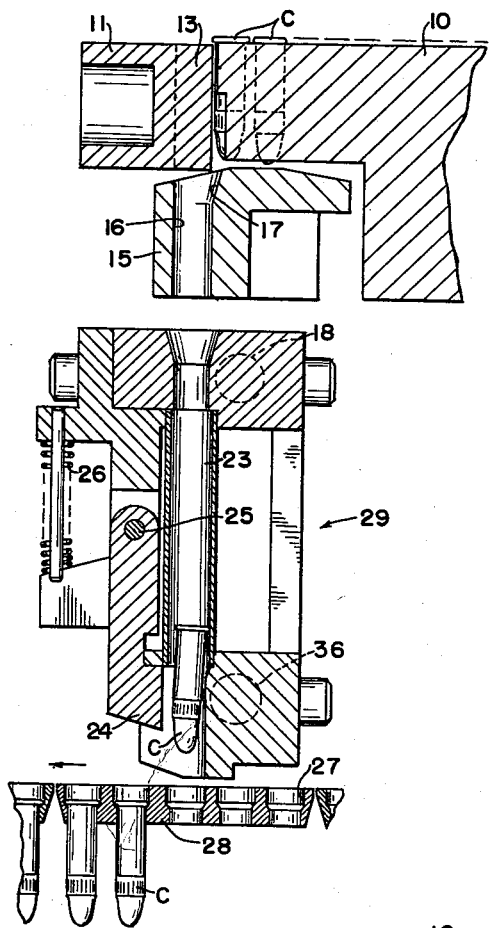
FIG. 3 is a transverse section substantially on line 3—3 of FIG. 2, showing the cartridge transfer bar in normal position, as it is in FIG. 1.
Figure 4:
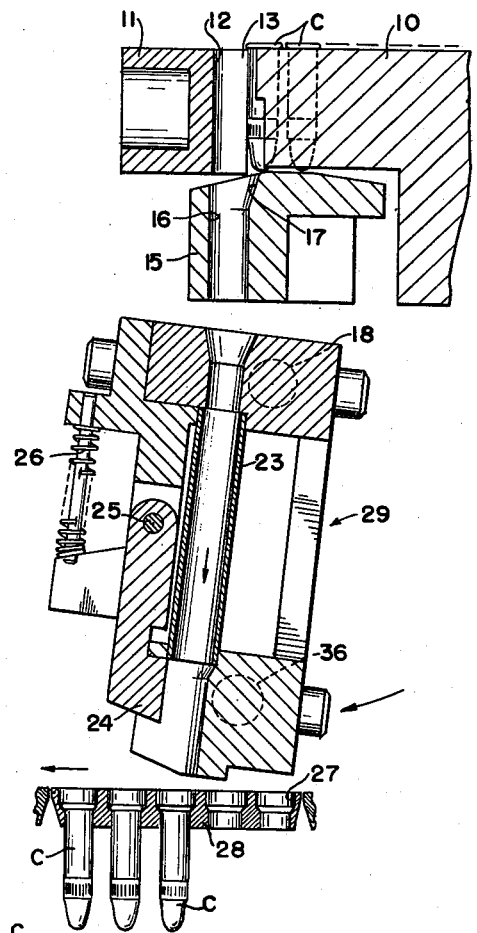
FIG. 4 is a fragmentary section similar to FIG. 3, showing the transfer bar in cartridge dropping position.

The open lower end of each passage 23 is vertically adjacent a cartridge receiving aperture 27 in a continuously moving carrier 28. This carrier may be a continuous belt as shown in the aforementioned patent to Collins et al., or it may comprise a series of plates either permanently or removably secured to continuously driven elements as suggested in the forementioned patent to Mills et al., or it may comprise apertures in the surface of a drum as shown in FIG. 7. Any continuously moving apertured member will suffice. The movement of assembly 29 is so timed that, when the assembly is in normal position shown in FIG. 3, each passage 23 is in vertical alignment with an aperture 27 and, as carrier 28 advances, assembly 29 is rocked to the FIG. 4 position; and during this movement the delivery end of each passage 23 remains substantially in alignment with the associated aperture 27, thus insuring the complete delivery of cartridges from passages 23 into the carrier. The assembly 29 is then returned to normal position in alignment with the next succeeding aperture 27, at which time the next succeeding row of cartridges is dropped by the leftward (FIG. 2) movement of transfer bar 11 and falls directly through passages 16 and 23 and into the carrier while assembly 29 is being oscillated to maintain approximate alignment of its passages 23 with apertures 27.

Figure 6:
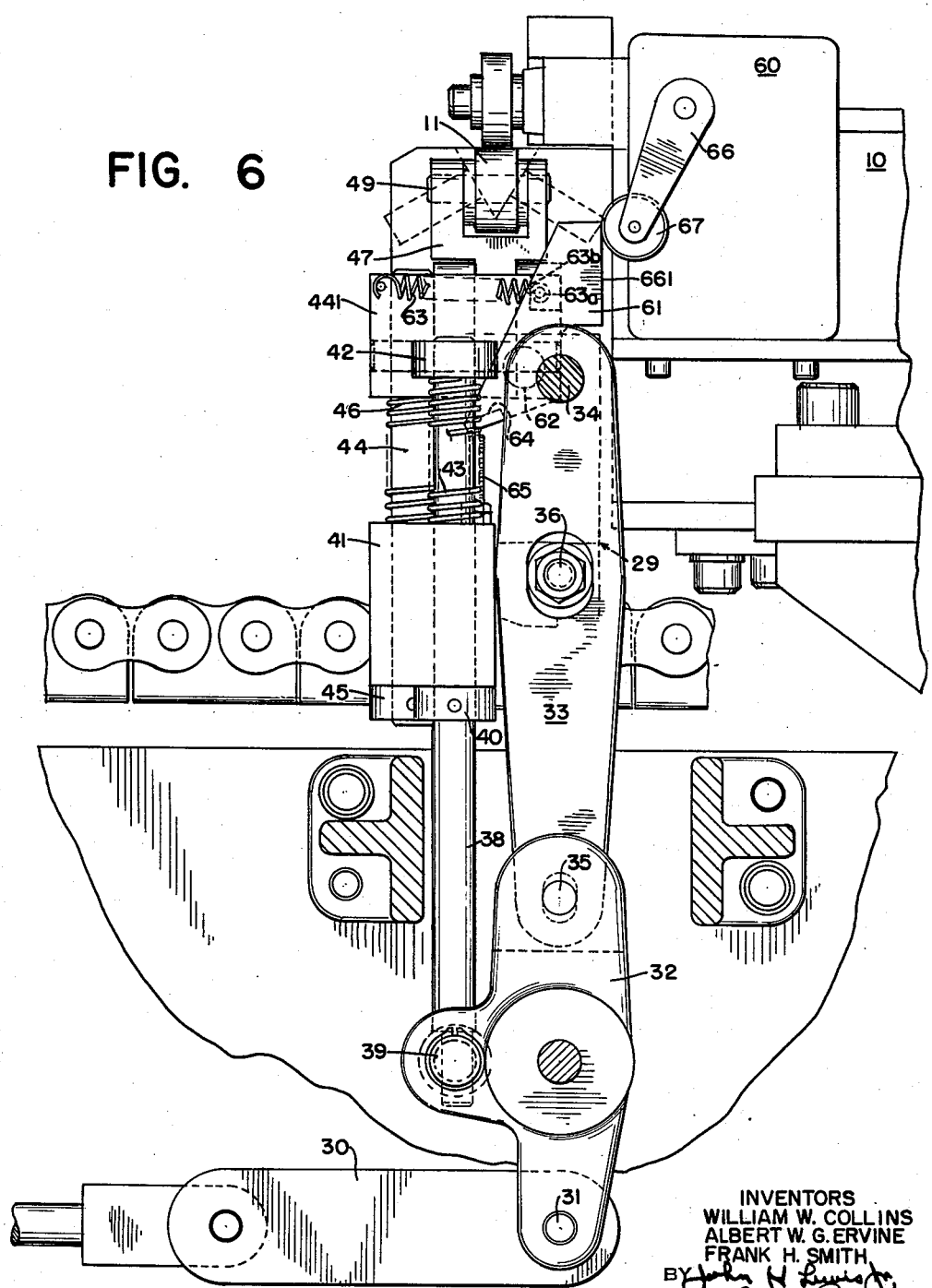
FIG. 6 is a vertical section on line 6—6 of FIG. 2, showing the operating mechanism for the transfer bar and the oscillating delivery tubes.

Both transfer bar 11 and oscillating assembly 29 are moved from a driven link 30 (FIG. 6), pivoted at 31 to a three-armed lever 32. The driving train for the oscillating assembly comprises lever 33 mounted on fixed pivot 34, joined at 35 to lever 32 and at 36 to an arm 171 (FIG. 2) extending from assembly 29. Preferably, this and other drive mechanism to be described is duplicated at the opposite side of the machine to insure the accuracy of movement necessary to accomplish the results heretofore described. Pivot 36 is in vertical alignment with pivot 18 (FIG. 3), and pivot 34 is in longitudinal alignment with pivot 18.

The drive mechanism for the transfer bar comprises the vertically disposed and endwise moving shaft 38 pivoted to an arm of lever 32 at 39. Secured to said shaft 38 is a shaft collar 40 underlying a floating block 41, apertured to receive shaft 38. To the upper end of shaft 38 is secured a collar 42, and a spring 43 is compressed between collar 42 and the top of block 41. Block 41 is also apertured to loosely receive a second vertically moving shaft 44 provided with a collar 45 underlying block 41. The upper end of shaft 44 is secured to a head 441, and a spring 46 is compressed between a surface of said head and the top of block 41. Pivoted to head 441 is one arm of a bell crank lever 47 carried by fixed pin 48 and pivotally joined at 49 to a projecting end of transfer bar 11. It will be seen that the described arrangement of shafts 38 and 44 and associated parts provides a driving connection for the transfer bar 11 which is adapted to yield in the event that the movement of said transfer bar in either direction is obstructed. Movement to the left (FIGS. 1 and 2) necessitates compressing spring 46, and movement to the right necessitates compressing spring 43. Movement of the transfer bar in either direction is limited by suitable stops such as the screw 50 which has a fixed mount and is adapted to engage an appropriate surface of the assembly comprising the said transfer bar.

In the leftward movement of the transfer bar the row of cartridges in the slots 12 is being separated from adjacent cartridges held in rails 10 as heretofore described. Should a jam occur in this movement it is desirable that the machine be stopped to enable clearing the jam. For this purpose a microswitch 60 is provided, the actuation of the microswitch controlling the machine driving motor in a well-known manner. The leftward movement of the transfer bar is effected by an upward movement of both block 41 and head 441. If the movement of head 441 is obstructed, the spring 46 is compressed as block 41 is positively moved upward. To effect operation of the microswitch, a plate 61 is pivoted to head 441 at 62 (FIG. 6) and is urged to normal position by a spring 63. A spring anchor pin 63a is mounted in the plate 61 and has a lateral extension which engages a stop surface 63b to control the normal position of the plate 61. Said plate 61 comprises a transverse extension 64 which is in the path of movement of an adjustable screw 65 carried in the top of block 41. A lever 66 projecting from microswitch 60 is provided with a roller 67 which is normally traversed by the face 661 of plate 61 as head 441 moves up and down. If said head 441 fails to move upward, extension 64 is contacted by screw 65, rocking plate 61, and the switch operating lever 66, thus stopping the machine.

In the modification shown in FIG. 7, empty or primed shells or like headed articles are transferred from slots defined by vibrating rails 100 into individual receptacles 114 in the surface of a revolving drum 110. Notched transfer bar 111 receives the foremost shell from each rail slot and transfers it laterally into alignment with an aperture in an oscillating bar 112, through which it falls into a drum receptacle. Bar 112 is supported for arcuate movement substantially parallel to the drum surface in a frame comprising radial arms 115. Its cam-controlled advance movement approaches unison with the drum movement, while a quick return movement is effected by suitable means, such as spring 113. Rotation of drum 110 brings the loaded receptacles 114 to the bottom portion thereof, where the articles in the receptacles drop into receptacles 117 on a continuously moving conveyor 116.

It is obvious that the invention set forth is susceptible to embodiment in other forms, and that structural details may vary widely.

What is claimed is:

1. Apparatus for producing an ordered arrangement of elongated longitudinally asymmetric articles comprising a first means for arranging said articles in a plurality of rows in touching relation, means to segregate the foremost article in each of said rows from the remainder of the row and to move the articles so segregated to a position transversely of said rows, a moving article carrier spaced from said articles in said transverse position, means for conducting said segregated articles from said transverse position to said article carrier, said articles comprising head portions extending transversely from the article bodies, and said first means comprises a plurality of slots in which said articles are suspended by their heads.

2. Apparatus for producing an ordered arrangement of elongated longitudinally asymmetric articles comprising a first means for arranging said articles in a plurality of rows in touching relation, means to segregate the foremost article in each of said rows from the remainder of the row and to move the articles so segregated to a position transversely of said rows, a moving article carrier spaced from said articles in said transverse position, means for conducting said segregated articles from said transverse position to said article carrier, said article segregating means comprising a transfer bar positioned transversely of said slots, said bar comprising recesses normally held opposite the ends of said slots respectively, each recess being adapted to receive an article from its associated slot.

3. Apparatus according to claim 2 in which said transfer bar is movable transversely of said slots to an article delivering position.

4. Apparatus according to claim 3 comprising transfer bar moving devices embodying means adapted to yield in the event that movement of the transfer bar is obstructed.

5. Apparatus according to claim 4 in which said transfer bar moving devices comprise separate members for effecting respectively the advance movement and the return movement of said transfer bar, each of said members comprising a connection adapted to yield if the movement of the transfer bar normally effected by said members respectively is obstructed.

6. Apparatus according to claim 5 comprising a microswitch operating arm adapted to be displaced by the yielding of one of said connections.

7. Apparatus according to claim 3 in which said transfer bar comprises abutments between said recesses, said abutments acting to retain articles in said slots when said bar is displaced from normal position.

8. Apparatus according to claim 7 in which said abutments comprise cam faces adapted to facilitate the separation of articles in said recesses from articles in said slots.

9. Apparatus according to claim 7 comprising abutments adapted to support the articles in said recesses when said transfer bar is in normal position.

10. Apparatus according to claim 9 comprising fixed tubular members adapted to guide the movement of articles delivered from said recesses when said transfer bar is in article delivering position.

11. Apparatus according to claim 9 comprising an element supported in substantially parallel relationship to said transfer bar, said element comprising a plurality of tubular passages associated respectively with said recesses, said element being movable in the direction of movement of said article carrier in timed relation to the movement of said article carrier and said transfer bar.

12. Apparatus according to claim 11 in which said element has a reciprocating movement, its movement in one direction approaching unison with the movement of the article carrier.

13. Apparatus for securing an ordered arrangement of articles comprising a movable article carrier having spaced individual article-holding means, an element having individual article passages vertically spaced in conformity with the spacing of said movable article-carrier article-holding means, means for delivering articles to said element, and means for displacing said element in the direction of the movement of said carrier, whereby substantial vertical alignment of said passages with said individual article-holding means is maintained throughout a limited movement of said carrier, each of said passages comprising a yielding wall adapted to be displaced if the normal movement of an article through said passage is obstructed.

14. Apparatus for securing an ordered arrangement of articles comprising a movable article carrier having spaced individual article-holding means, an element positioned substantially directly above said movable article carrier, said element having individual article confining and conducting passages spaced in conformity with the spacing of and normally in vertical alignment with said movable article-carrier article-holding means, means substantially directly above said element for delivering articles to said element, and means cooperating with said movable article carrier for displacing said element in the direction of the movement of said carrier, whereby substantial vertical alignment of said passages with said individual article-holding means in maintained throughout a limited movement of said carrier.

15. Apparatus according to claim 14 in which said article carrier comprises a sequence of rows of individual article-holding means, and said element is reciprocated to align said passages with each row of said sequence in turn, and to substantially maintain such alignment as the carrier continuously advances.

References Cited in the file of this patent

UNITED STATES PATENTS

| | | |
|---|---|---|
| 1,766,142 | Olson | June 24, 1930 |
| 1,824,432 | Hendry | Sept. 22, 1931 |
| 1,856,976 | Strelow | May 3, 1932 |
| 1,984,981 | Neff | Dec. 18, 1934 |
| 2,790,531 | McVicker | Apr. 30, 1957 |
| 2,868,353 | Wakeman | Jan. 13, 1959 |